(12) United States Patent
Quenedey

(10) Patent No.: US 10,112,362 B2
(45) Date of Patent: Oct. 30, 2018

(54) ALVEOLAR MULTILAYER STRUCTURE HAVING A METAL COATING

(71) Applicant: Akx, SA, Alfortville (FR)

(72) Inventor: Jean Patrice Quenedey, Paris (FR)

(73) Assignee: AKX, SA, Alfortville (FR)

( * ) Notice: Subject to any disclaimer, the term of this patent is extended or adjusted under 35 U.S.C. 154(b) by 115 days.

(21) Appl. No.: 15/018,614

(22) Filed: Feb. 8, 2016

(65) Prior Publication Data

US 2016/0229150 A1    Aug. 11, 2016

Related U.S. Application Data

(63) Continuation of application No. 13/700,333, filed as application No. PCT/FR2011/051223 on May 27, 2011, now abandoned.

(30) Foreign Application Priority Data

May 27, 2010    (FR) ...................... 10 54073

(51) Int. Cl.
*B32B 3/12*         (2006.01)
*B32B 7/04*         (2006.01)
(Continued)

(52) U.S. Cl.
CPC ................ *B32B 3/12* (2013.01); *B32B 3/266* (2013.01); *B32B 3/28* (2013.01); *B32B 7/045* (2013.01);
(Continued)

(58) Field of Classification Search
CPC ..... B32B 3/12; B32B 7/045; B32B 2255/205; B32B 2307/304; B32B 2553/026;
(Continued)

(56) References Cited

U.S. PATENT DOCUMENTS 4,618,517 A  *  10/1986  Simko, Jr. ................ B32B 3/20
                                                        138/145
4,825,089 A  *   4/1989  Lindsay ............. E04L 31/7654
                                                        250/515.1
(Continued)

FOREIGN PATENT DOCUMENTS

GB           2079415 A  *  1/1982  ............. B65D 90/06
GB           2186838 A      8/1987
(Continued)

OTHER PUBLICATIONS

Merriam-Webster Online Dictionary, "Disjoint Definition", http://www.merriam-webster.com/dictionary/disjoint, Feb. 5, 2015.

(Continued)

*Primary Examiner* — Samir Shah
*Assistant Examiner* — Jasper Saberi
(74) *Attorney, Agent, or Firm* — Kilpatrick Townsend & Stockton LLP

(57) ABSTRACT

A multilayer structure is disclosed, comprising: at least one first layer comprising a first polymer film that carries, on a first face, a metal deposit, the first face being a free face of the first layer; and at least one second layer comprising a second polymer film. The second layer is joined, in a plurality of junction zones, to the first layer on the first face carrying the metal deposit, the junction zones defining a region of contact between the first layer and the second layer, the first layer and the second layer forming at least one cell outside the contact region.

16 Claims, 2 Drawing Sheets

(51) Int. Cl.
*B32B 27/08* (2006.01)
*B32B 27/30* (2006.01)
*B32B 27/32* (2006.01)
*B32B 3/26* (2006.01)
*B32B 3/28* (2006.01)
*E04B 1/78* (2006.01)
*E04B 1/76* (2006.01)

(52) U.S. Cl.
CPC ............ *B32B 27/08* (2013.01); *B32B 27/308* (2013.01); *B32B 27/32* (2013.01); *E04B 1/78* (2013.01); *B32B 2250/246* (2013.01); *B32B 2250/40* (2013.01); *B32B 2255/10* (2013.01); *B32B 2255/205* (2013.01); *B32B 2307/304* (2013.01); *B32B 2307/51* (2013.01); *E04B 2001/7691* (2013.01); *Y10T 428/24331* (2015.01); *Y10T 428/24661* (2015.01)

(58) Field of Classification Search
CPC ....... B32B 2253/026; Y10T 428/24331; E04B 1/78; E04B 2001/7691; B65D 81/03; B65D 81/052
See application file for complete search history.

(56) References Cited

U.S. PATENT DOCUMENTS

| | | | |
|---|---|---|---|
| 5,688,578 A * | 11/1997 | Goodrich | B21D 31/04 206/521 |
| 6,251,495 B1 | 6/2001 | Wilson et al. | |
| 6,423,166 B1 * | 7/2002 | Simhaee | B29C 53/16 156/145 |
| 9,757,925 B2 * | 9/2017 | Duong | B32B 7/14 |
| 2002/0197450 A1 | 12/2002 | Orologio et al. | |
| 2003/0061777 A1 * | 4/2003 | Alderman | E04B 9/045 52/407.3 |
| 2003/0129330 A1 | 7/2003 | Alderman et al. | |
| 2006/0029777 A1 | 2/2006 | Yanai et al. | |
| 2006/0210773 A1 * | 9/2006 | Kannankeril | B29C 51/225 428/166 |
| 2013/0017369 A1 * | 1/2013 | Rasmussen | B32B 3/12 428/166 |

FOREIGN PATENT DOCUMENTS

WO WO 86/07011 12/1986
WO 95/13915 5/1995

OTHER PUBLICATIONS

Merriam-Webster Online Dictionary, "Quilt_Merriam-Webster," http://www.merriam-webster.com/dictionary/quilt, Apr. 25, 2009.
PCT Search Report for WO 2011/148114 A1, May 27, 2011, 2.
European Patent Office, International Search Report in International Application No. PCT/FR2011/051223, dated Aug. 3, 2011.
U.S. Appl. No. 13/700,333, "Final Office Action", Oct. 7, 2015, 22 pages.

* cited by examiner

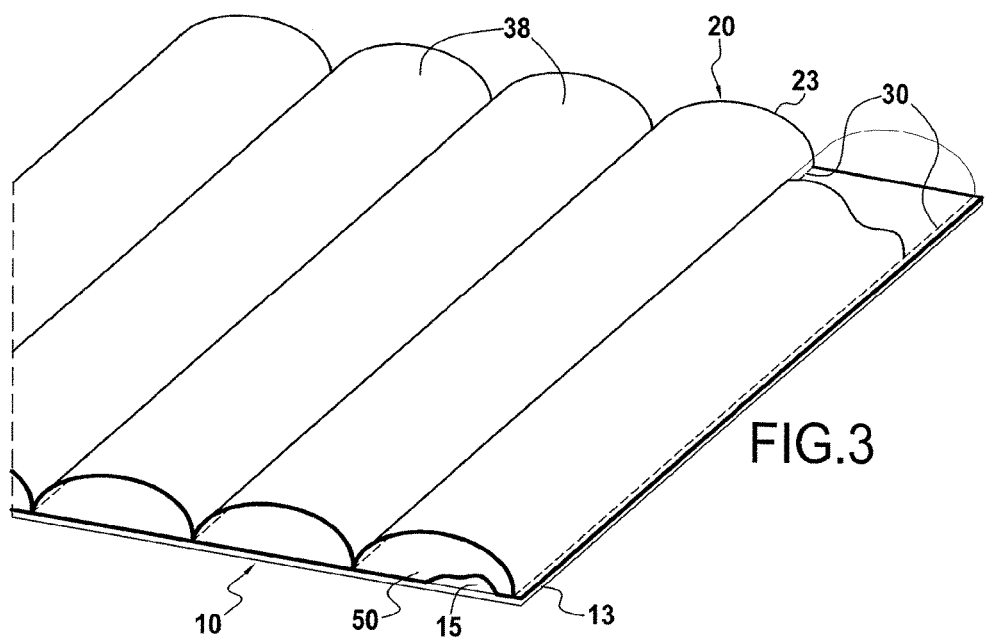
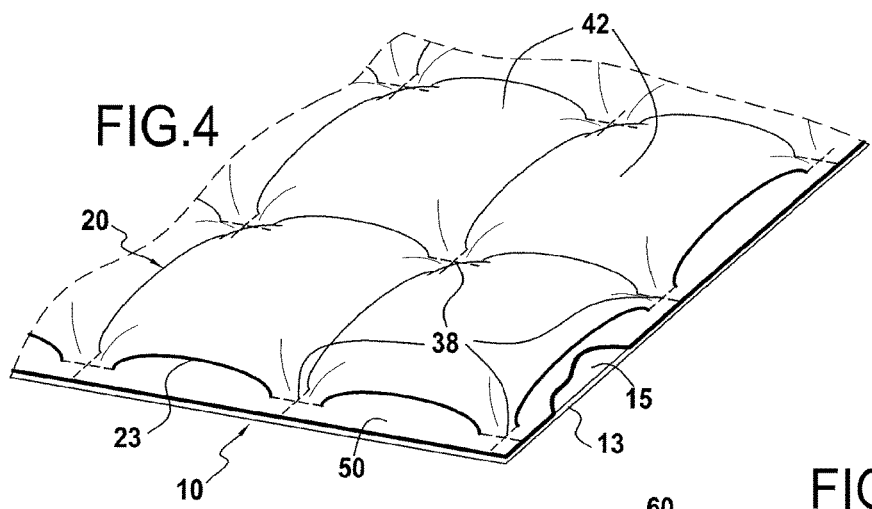
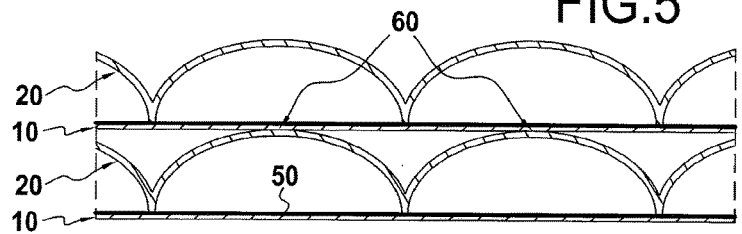

ALVEOLAR MULTILAYER STRUCTURE HAVING A METAL COATING

CROSS-REFERENCES TO RELATED APPLICATIONS

This application is a continuation of U.S. patent application Ser. No. 13/700,333, filed Mar. 26, 2013; which is a 371 national phase application of International Application No. PCT/FR2011/051223, filed May 27, 2011; which claims priority to French Application No. 1054073, filed May 27, 2010. The disclosures of each are hereby incorporated herein by reference in their entirety.

BACKGROUND OF THE INVENTION

The present invention relates to a multilayer structure comprising: at least one first layer comprising a first polymer film that carries, on a first face, a metal deposit, the first face (15) being a free face of said first layer (10); and a second layer comprising a second polymer film.

Structures are known that are constituted by a plurality of layers such as a polymer film, possibly with a metal deposit, a metal film, polymer foam, fiberglass, rock wool. Stacking such layers seeks to multiply the thermal barriers, so as to thermally insulate the air situated on one side of the structure from the air situated on the other side.

However, such multilayer structures provide little insulation since air is free to flow between the layers and thus to pass via the sides of the structure from a space between two layers to another space between two layers, and this contributes to transferring heat through the multilayer structure.

It is possible to contain the structure in a frame that holds the edges of the layers of the structure captive so as to prevent the air from flowing. However, the material of the frame then acts as a thermal bridge that greatly reduces the thermal insulating properties of the structure.

BRIEF SUMMARY OF THE INVENTION

The present invention seeks to remedy those drawbacks.

The invention seeks to propose a multilayer structure having improved thermal insulation properties.

This object is achieved as a result of the second layer being joined, in a plurality of junction zones, to the first layer on the first face carrying said metal deposit, the junction zones defining a region of contact between the first layer and the second layer, the first layer and the second layer forming at least one cell outside the contact region.

By means of such provisions, the metallized face of the first film carrying the metal deposit is in contact with the volume of air (or of gas) present in the space between the first film and the second layer. This presents several advantages compared to the prior-art solution in which the space is filled by another material such as foam or by fibers such as wool. Since such materials are opaque to infrared radiation, infrared radiation is absorbed and then re-emitted by such materials. However, such re-emission is weak since the temperature gradient between the fibers or between the walls of the pores in the foam is very low. The dissipation of heat by radiation by such material is thus very small. Even if the first layer is metal, the barrier of the metal to radiant heat transfer is minimized by its contact with the above material, and the metal contributes solely to limiting the transmission of infrared and far-infrared radiation.

In contrast, in the solution of the invention, since the metal deposit is directly in contact with the volume of air (or of gas) which is more transparent to thermal radiation than foam or fibers, the thermal radiation re-emitted by the metal deposit does not contribute to heating the space between the first layer and the second layer.

In addition, given that the metallized face has lower emissivity than the other face of the first film (e.g. made of polymer) of the first layer, it re-emits less radiation towards the other face (and thus through the first layer), and given that the metallized face is opaque, no radiation can pass through the first layer.

This results in better thermal insulation for a structure comprising an assembly of the invention formed of the first layer and of the second layer.

Advantageously, the region of contact between the first layer and the second layer comprises a set of crossed continuous lines that form a grid, such that the portions of the first layer and of the second layer that are separated by the lines form a set of closed disjoint cells.

For example, all of the space between the first layer and the second layer comprises a set of closed disjoint cells.

BRIEF DESCRIPTION OF THE DRAWINGS

The invention can be well understood and its advantages appear better on reading the following detailed description of an embodiment shown by way of non-limiting example. The description refers to the accompanying drawings, in which:

FIG. 3 is a perspective and section view of another configuration of a multilayer structure of the invention;

FIG. 4 is a perspective and section view of another configuration of a multilayer structure of the invention; and FIG. 5 is a section view of another configuration of a multilayer structure of the invention.

DETAILED DESCRIPTION OF THE INVENTION

In the following description, the terms "inner" and "outer" respectively indicate, with reference to any two adjacent layers, the space between the two layers and the region outside the two layers.

Figure 1:
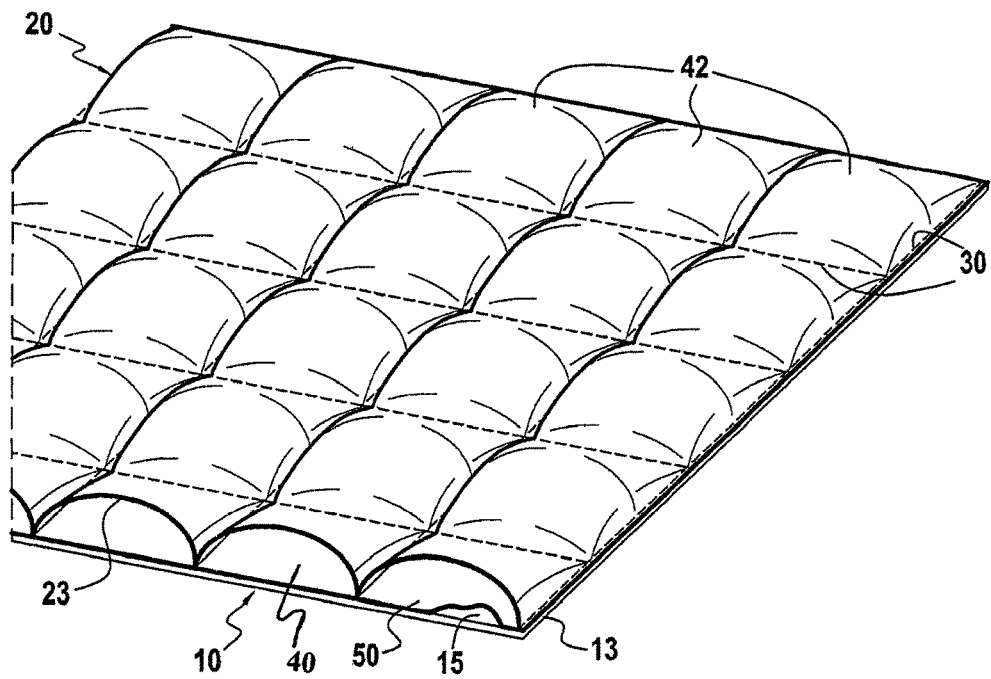
FIG. 1 is a perspective and section view of a multilayer structure of the invention.

FIG. 1 shows an example of a two-layer structure of the invention. The first layer 10 is constituted by a first polymer film 13 that carries a metal deposit 50 on one of its faces, referred to as its "first" face 15.

The polymer film 13 of the first layer 10 may itself be constituted by a plurality of polymer films. For example, the polymer film 13 may be constituted by a film made of polyethylene (PE) sandwiched between two films made of Surlyn® (manufactured by Dupont de Nemours).

A second layer 20, constituted by a second polymer film 23, is fastened on the first face 15 that carries the metal deposit 50.

Said fastening is performed in known manner, e.g. using a second film 23 comprising Nucrel® (manufactured by Dupont de Nemours).

The second film 23 is fastened on the first film 13 in certain selected junction zones of the surface of the first film 13. These junction zones taken together are referred to as the contact region 30.

Outside the contact region 30, the first layer 10 and the second layer 20 co-operate to define a space 40 that has a shape that varies depending on the arrangement of the junction zones forming the contact region 30. Whatever the configuration, at least a portion of the space 40 is in the shape of a cell 42, i.e. in this portion, and at rest, the first layer 10 and the second layer 20 form a cell 42 occupying a certain volume, as shown in FIG. 1. A layer is at rest when it is not stressed.

For example, the contact region 30 is configured in such a manner that the second layer 20 is quilted when the first layer 10 is plane.

In FIG. 1, the region 30 of contact between the first layer 10 and the second layer 20 comprises a set of crossed continuous lines 38 that form a grid, such that some or all of the first layer 10 and of the second layer 20 form(s) a set of closed disjoint cells 42 that are separated by the lines, the cells 42 thus forming a checkerboard.

The continuous lines 38 may be curved or rectilinear.

For example, the first half of the lines 38 are parallel to one another, the other half of the lines 38 being parallel to one another and perpendicular to the lines 38 of the first half, such that the cells 42 that are separated by the lines 38 form a rectangular checkerboard, as shown in FIG. 1.

Given that the first face 15 of the first film 10 carrying the metal deposit 50 is in contact with the volume of air present in the cells 42 between the first layer 10 and the second layer 20, or, in equivalent manner, between the first film 10 and the second film 20, and that the metallized face 15 constitutes the face of the first film 10 having the lowest emissivity, heat flow through the cells 42 is minimized. This results in better thermal insulation for a multilayer structure 1 comprising an assembly formed of the first layer 10 and of the second layer 20, compared to a multilayer structure in which it is the face remote from the metallized face 15 of the first film 10 that is in contact with the volume of air present in the cells 42 between the first layer 10 and the second layer 20, since said remote face, being made of polymer, has higher emissivity.

Furthermore, given that the cells 42 are closed, all of the volume of air between the first layer 10 and the second layer 20 is held captive in the cells 42, and consequently heat transfers by convection between the two layers are minimized. This results in better thermal insulation than if the cells 42 were open.

Advantageously, the cells 42 contain a gas that is more thermally insulating than ambient air. For example, the gas may be dry air or argon.

In another configuration, each of the above-described cells 42 presents a hole 425.

The hole may pass through the first layer 10 or through the second layer 20.

Advantageously, the cell shape maximizes the springy properties of the second layer 20. For example, the cells may be cylindrical in shape, having a base that is circular or hexagonal.

Figure 2:
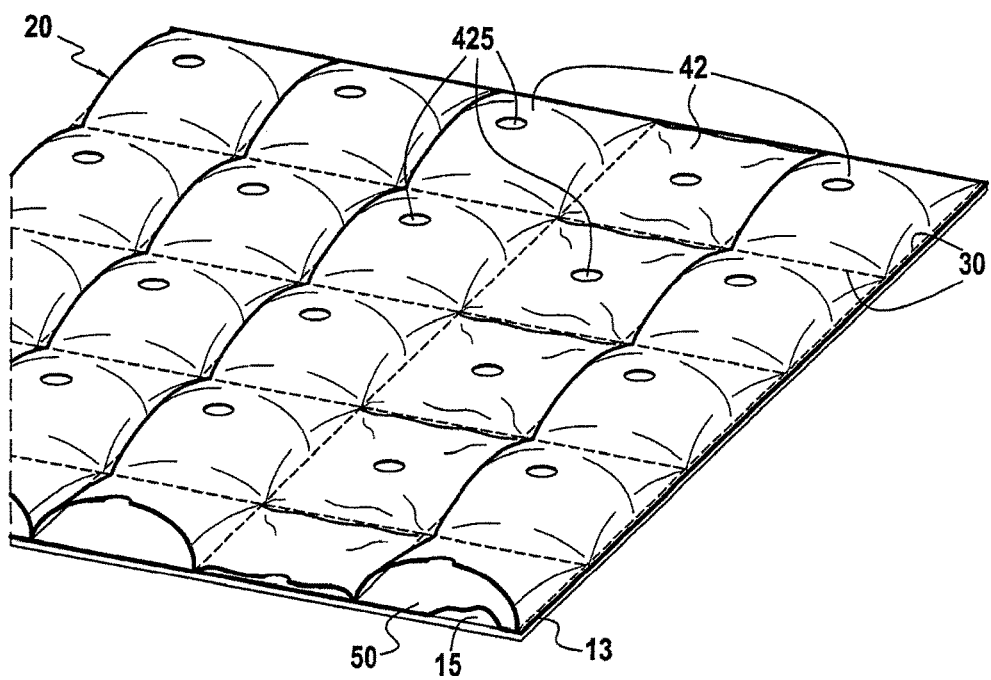
FIG. 2 is a perspective and section view of another configuration of a multilayer structure of the invention.

Thus, when it is constituted by deformable layers, the multilayer structure 1 may be flattened so as to form a thin sheet, since the air can thus leave the cells 42 via the holes 425. Such a structure is shown in FIG. 2. The total volume of a multilayer structure 1 containing one or more assemblies formed of such first and second layers 10 and 20 may thus be considerably reduced while it is being transported. For example, the multilayer structure 1, once flattened, may be rolled up so as to form a roll.

Once on site, the multilayer structure 1 may be relieved of stresses and placed at rest, so as to return to its initial deployed configuration. This initial configuration is achieved by means of the springiness of the deformable films that form the structure, which springiness tends to cause the cells 42 to return to their initial convex shape. Once deployed, the multilayer structure 1 thus offers good thermal insulation.

For example, such a structure may be cut to the appropriate size, then placed in the spaces between the rafters below the roof of a dwelling so as to improve the thermal insulation of the dwelling.

If the structure 1 is suspended by its top face, the weight of the layers situated below the top face contributes, under the effect of gravity, to causing the structure 1 to return to its initial deployed configuration. Gravity thus acts in addition to the springiness of the layers of the structure 1.

The holes 425 may be situated at the tops of the cells 42, passing through the second layer 20.

Each cell 42 may present a plurality of holes 425 that are distributed over the first layer 10 and/or over the second layer 20.

In another configuration, the contact region 30 comprises a set of disjoint continuous lines 38, such that the portions of the first layer 10 and of the second layer 20 that are separated by the lines 38 form a set of disjoint cells 42 that are open to the outside. For example, all of the contact region 30 may be formed of such lines 38, as shown in FIG. 3. The cells 42 are open to the outside via the side edges of the second layer 20.

A multilayer structure 1 containing one or more assemblies formed of such first and second layers 10 and 20, may be flattened for being transported, then deployed as explained above. In this configuration, the air leaves the cells 42 naturally, since said cells are open to the outside.

In another configuration, the contact region 30 comprises a set of disjoint zones 38, such that the portions of the first layer 10 and of the second layer 20 that surround the zones 38 form a set of cells 42 that communicate with one another. For example, all of the contact region 30 may be formed of such zones 38, as shown in FIG. 4.

The cells 42 may also communicate with the outside, e.g. via holes in the side edges of the second layer 20, or via holes 425 in the cells 42, as explained above.

A multilayer structure 1 containing one or more assemblies formed of such first and second layers 10 and 20, may be flattened for being transported, then deployed as explained above. In this configuration, the air leaves the cells 42 naturally, since said cells are open to the outside.

In all of the above-mentioned embodiments, it is advantageous for the contact region 30 formed by the set of junction zones joining together the first and second layers 10 and 20 to be of an area that is very small compared to the total area of the surface of the first film 10 facing the second film 20. The junction zones act as thermal bridges through the multilayer structure since they absorb thermal radiation and are thus emissive. A structure in which thermal bridges are minimized is thus more thermally insulating.

The multilayer structure 1 of the invention may also be built up by superposing any number of assemblies, each formed of a first layer 10 and/or of a second layer 20, as described above. The second layer 20 is thus in contact with the first layer 10 of the adjacent assembly via an inter-assembly contact region 60, as shown in FIG. 5.

In this configuration, it is advantageous for the contact region 30 of one assembly and the region 60 of inter-assembly contact with the adjacent assembly not to be superposed, so as to minimize thermal bridges.

When each of the cells 42 presents one or more holes 425 passing through the second layers 20, and when the multilayer structure 1 must be capable of being flattened, the first layers 10 are also provided with holes so as to enable the air to escape from the space between the second layer 20 of one assembly and the first layer 10 of the adjacent assembly.

Advantageously, the holes are offset between two adjacent assemblies, so as to optimize the thermal insulation provided by the multilayer structure 1.

Alternatively, the space between the second layer 20 of one assembly and the first layer 10 of the adjacent assembly may open to the outside via the side edges of the structure.

In an assembly made up of a first layer 10 and of a second layer 20 as described above, the contact region 30 may be formed of a combination of contact lines 38 and/or of contact zones 38, as described above.

Alternatively, the contact region 30 may be formed of contact lines 38 or of contact zones 38 of a single type, as described above.

In the invention, some or all of a multilayer structure 1 may be formed of any combination of such assemblies.

For example, the multilayer structure 1 may be constituted by a plurality of superposed assemblies, each made up of a first layer 10 and of a second layer 20 forming disjoint cells 42. In each assembly, some of the cells 42 present holes 425, the cells 42 having holes 425 being distributed differently from one assembly to another, such that a straight line perpendicular to the assemblies and passing through the cells always passes through the same number of cells 42 having holes 425. Thus, the multilayer structure 1 can be compacted in part only (since the air-filled cells 42 without holes cannot be flattened), but in its compacted state, it has a thickness that is substantially constant.

In the above description, a first layer 10 is a polymer film that carries, on one face, a metal deposit, and a second layer 20 is a polymer film.

In the invention, a first layer 10 may also comprise a plurality of films, and/or the second layer may also comprise a plurality of films.

The multilayer structure 1 of the invention may also include superposing any number of assemblies, with each assembly being formed of a first layer 10 and/or of a second layer 20, as described above, and of third layers that are interposed between one or more of said assemblies. By way of example, a third layer comprises a third polymer film.

Advantageously, the third layer is joined, in a plurality of junction zones, to the second layer 20 of a first assembly, the junction zones defining a contact region having a surface area that is smaller than the surface area of the second layer 20, and the third layer is also joined, in a plurality of junction zones, to the first layer 10 of another assembly, the junction zones defining a contact region having a surface area that is smaller than the surface area of the first layer 10. The third layer thus makes it easier to assemble together two adjacent assemblies. By way of example, the contact regions are a combination of lines 38 and/or of zones 38, as described above.

The first, second, and/or third layers may optionally be provided with holes 425.

What is claimed is:

1. A thermally insulating structure, comprising:
    a multi-layer film including a first polymer layer and a metallized layer;
    a second polymer layer joined to the multi-layer film;
    wherein a portion of the multi-layer film and a portion of the second polymer layer are joined at a plurality of disjoint zones positioned along rectilinear lines and disposed in an array, wherein the plurality of disjoint zones define a set of cells wherein each cell of the set of cells has four openings positioned between adjacent disjoint zones, wherein the four openings enable communication between each cell of the set of cells and four adjacent cells of the set of cells;
    wherein the thermally insulating structure comprises:
        a flattened state wherein the second polymer layer is compressed against the multi-layer film;
        a deployed state wherein the second polymer layer is separated from the multi-layer film by a volume of gas while remaining joined at the plurality of the disjoint zones; and
        at least one side edge that remains open to an ambient environment in both the flattened state and the deployed state.

2. The thermally insulating structure of claim 1, wherein the second polymer layer is joined directly to the metallized layer at the plurality of disjoint zones.

3. The thermally insulating structure of claim 1, wherein each cell of the set of cells has a rectangular geometry.

4. The thermally insulating structure of claim 1, wherein a surface area of the second polymer layer is greater than a surface area of the multi-layer film.

5. A multi-layer insulating structure, comprising:
    a first polymer layer; and
    a second polymer layer coupled to the first polymer layer, wherein a portion of the first polymer layer and a portion of the second polymer layer are joined at a plurality of disjoint zones positioned along rectilinear lines and disposed in an array, wherein the plurality of disjoint zones define a set of cells wherein each cell of the set of cells has four openings positioned between adjacent disjoint zones, wherein the four openings enable communication between each cell of the set of cells and four adjacent cells of the set of cells;
    wherein the multi-layer insulating structure comprises:
        a flattened state wherein the second polymer layer is compressed against the first polymer layer;
        a deployed state wherein the second polymer layer is separated from the first polymer layer by a volume of gas while remaining joined at the plurality of the disjoint zones; and
        at least one side edge that remains open to an ambient environment in both the flattened state and the deployed state.

6. The multi-layer insulating structure of claim 5, further comprising:
    a metallized layer disposed between the first polymer layer and the second polymer layer.

7. The multi-layer insulating structure of claim 6, wherein the metallized layer defines a portion of each cell in the set of cells.

8. The multi-layer insulating structure of claim 5, wherein the second polymer layer is separated by a volume of a gas from the first polymer layer in the deployed state and remains joined to the first polymer layer at the plurality of disjoint zones in the flattened state and deployed state.

9. The multi-layer insulating structure of claim 5, wherein the second polymer layer comprises a copolymer formed from ethylene and methacrylic acid.

10. The multi-layer insulating structure of claim 5, wherein the set of cells comprises a grid of rectangular cells.

11. The multi-layer insulating structure of claim 5, wherein material properties of the second polymer layer cause each cell in the set of cells to return to a convex shape in response to compressive force being removed from the set of cells.

12. A thermally insulating structure, comprising:
a multi-layer film including a first polymer layer and a metallized layer; and
a second polymer layer joined to the multi-layer film by a plurality of disjoint zones positioned along rectilinear lines and that defines a set of cells, at least two adjacent cells of the set of cells being joined together by an opening that connects the at least two adjacent cells and allows air within the adjacent cells to move between the adjacent cells; and wherein the thermally insulating structure comprises:
a flattened state wherein the second polymer layer is compressed against the multi-layer film;
a deployed state wherein the second polymer layer is separated from the multi-layer film by a volume of gas while remaining joined at the plurality of the disjoint zones; and
at least one side edge that remains open to an ambient environment in both the flattened state and the deployed state.

13. The thermally insulating structure of claim 12, wherein each cell of the set of cells is convex and connected to one or more adjacent cells.

14. The thermally insulating structure of claim 12, further comprising a layer of metal deposited on the first polymer layer.

15. The thermally insulating structure of claim 12, wherein the set of cells have a rectangular geometry and the disjoint zones associated with a first cell of the set of cells are positioned only at one of more corners of the first cell.

16. The thermally insulating structure of claim 15, wherein the opening is defined by a space between two of the one or more corners of the first cell and allows air to flow freely between the first cell and adjacent cells of the set of cells.

* * * * *